(12) United States Patent
Hidai (10) Patent No.: US 9,438,502 B2
(45) Date of Patent: Sep. 6, 2016

(54) CONTROLLING GENERATION OF FILTERED RESULT PACKETS

(71) Applicant: Viavi Solutions Inc., Milpitas, CA (US)

(72) Inventor: Takashi Hidai, Palo Alto, CA (US)

(73) Assignee: Viavi Solutions Inc., Milpitas, CA (US)

( * ) Notice: Subject to any disclaimer, the term of this patent is extended or adjusted under 35 U.S.C. 154(b) by 608 days.

(21) Appl. No.: 13/766,451

(22) Filed: Feb. 13, 2013

(65) Prior Publication Data

US 2013/0215752 A1    Aug. 22, 2013

Related U.S. Application Data

(60) Provisional application No. 61/600,484, filed on Feb. 17, 2012.

(51) Int. Cl.
*H04L 12/26* (2006.01)

(52) U.S. Cl.
CPC .............. *H04L 43/50* (2013.01); *H04L 43/04* (2013.01); *H04L 43/103* (2013.01); *H04L 43/16* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 6,356,951 B1 | 3/2002 | Gentry, Jr. .................... | 709/250 |
| 6,493,761 B1 | 12/2002 | Baker et al. .................. | 709/230 |
| 6,661,803 B1 | 12/2003 | Choi et al. .................... | 370/413 |
| 6,789,116 B1 | 9/2004 | Sarkissian et al. ........... | 709/224 |
| 7,110,398 B2 | 9/2006 | Grand et al. .................. | 370/389 |
| 7,236,492 B2 | 6/2007 | Davis et al. .................. | 370/392 |
| 7,580,408 B2 | 8/2009 | Kendall ........................ | 370/392 |
| 7,697,517 B2 | 4/2010 | Yazaki et al. ................. | 370/389 |
| 7,760,632 B2 | 7/2010 | Yano et al. ................. | 370/230.1 |
| 7,773,595 B2 | 8/2010 | Wing et al. .................... | 370/389 |
| 7,835,375 B2 | 11/2010 | Sarkinen et al. ............. | 370/401 |
| 7,870,278 B2 | 1/2011 | Corl, Jr. et al. ............. | 709/230 |
| 8,005,113 B2 | 8/2011 | Sultan et al. ................. | 370/470 |
| 8,023,419 B2 | 9/2011 | Oran .......................... | 370/250 |
| 8,059,532 B2 | 11/2011 | Riddle et al. ................. | 370/230 |
| 8,059,538 B1 | 11/2011 | Bhattacharyya et al. . | 370/230.1 |
| 2003/0118022 A1 | 6/2003 | Kulkarni et al. ............. | 370/392 |
| 2003/0198224 A1 | 10/2003 | Lee et al. ..................... | 370/392 |
| 2004/0001444 A1 | 1/2004 | Sadot et al. .................. | 370/252 |
| 2008/0162922 A1 | 7/2008 | Swartz ......................... | 713/150 |
| 2009/0097413 A1* | 4/2009 | Todd et al. ................... | 370/253 |
| 2009/0310494 A1* | 12/2009 | Ou ......................... | H04L 41/06 370/252 |
| 2012/0281715 A1* | 11/2012 | Shojania et al. ............. | 370/468 |
| 2013/0058235 A1* | 3/2013 | Johnsson ............ | H04L 12/2697 370/252 |
| 2013/0124718 A1* | 5/2013 | Griffith et al. ................ | 709/224 |

* cited by examiner

*Primary Examiner* — Marcus R Smith
(74) *Attorney, Agent, or Firm* — Harrity & Harrity, LLP (57) ABSTRACT

A result packet generator includes a processor for generation and injection of filtered result packets, at least one counter for determining input/output/result packet bandwidth, and a controller for suppressing generation of the filtered result packets when an output and/or result packet bandwidth and/or a percentage of the result packet bandwidth in the output bandwidth exceeds at least one pre-determined threshold, which may be remotely programmable.

20 Claims, 6 Drawing Sheets

CONTROLLING GENERATION OF FILTERED RESULT PACKETS

CROSS-REFERENCE TO RELATED APPLICATIONS

The present invention claims priority from U.S. Patent Application No. 61/600,484 filed Feb. 17, 2012, which is incorporated herein by reference.

TECHNICAL FIELD

The present invention relates to packet based digital communications, and in particular to devices and methods for troubleshooting, diagnostics, and monitoring packet based digital communications.

BACKGROUND OF THE INVENTION

In a packet-switched communication network, transmitted data is grouped into suitably sized blocks called packets. Packets carry both a payload data and a destination data. The network equipment routes each packet individually, based on the packet's destination data, and allocates transmission resources as needed.

Due to the packets being routed individually, and due to a large number of users in a typical packet-switched network, the bandwidth utilization at a particular physical port of the network can vary widely. Control mechanisms have been implemented to monitor data traffic and troubleshoot congested or malfunctioning locations or nodes of packet-switched networks.

One approach to troubleshooting a packet-switched network is to copy the entire network traffic at a faulty network node to a storage disk array, and then analyze the accumulated data to find a fault. This approach can be costly and inefficient in that the faulty network node location is generally not known in advance, so that the storage systems and the analyzing equipment need to be installed throughout the network for this approach to work. At tens of gigabits per second data speeds, very large data storage capacities are required at multiple nodes. Furthermore, a problem may not be associated with a single network node, and thus not easily identifiable by performing analysis at individual nodes.

Another, more cost-efficient approach is to install local monitors throughput the network. The local network monitors analyze individual multimedia streams, searching for data patterns associated with a particular network problem. Suspicious or faulty data packets including these target data patterns are duplicated and forwarded to a centralized location, where they can be analyzed.

Oran in U.S. Pat. No. 8,023,419 discloses a switched packet network monitoring system having a packet filter installed on one or more interfaces of a router, switch or other node in an IP network that identifies multimedia packets for a particular media stream. A packet replicator duplicates the identified packets, allowing the original packets to continue through the IP network. A forwarder encapsulates and sends the cloned media packets to a central facility, where the "tunneled" media stream can be analyzed. To preserve the bandwidth, the payloads of these "tunneled" packets may be dropped, or the headers may be compressed. Disadvantageously, dropped payloads can result in a loss of valuable diagnostic information.

SUMMARY OF THE INVENTION

The present invention addresses a problem of controlling a transmission bandwidth of service data packets used for data analysis and troubleshooting of a packet-switched network such as Ethernet, for example. These service data packets, termed herein "filtered result packets" or FRP, incorporate data portions and/or address/port portions of customer data packets having therein a pre-determined target bit pattern. The target bit patterns can be externally programmable. The FRP are encapsulated with necessary identification and delivery information, and are injected in the data stream for delivery to a centralized location for fault analysis, troubleshooting, monitoring, and the like. According to the invention, a rate of injection of FRP into the data stream is controlled to prevent congestion and interruption of customer data services.

In accordance with the invention, there is provided a result packet generator comprising:

a processor for receiving input data packets of an input data stream, generating filtered result packets including encapsulated data of input data packets containing a target data pattern, and injecting the generated filtered result packets into the input data stream, thereby obtaining an output data stream;

at least one result counter coupled to the processor, for obtaining at least one result count of non-idle words of the generated filtered result packets in at least one result time interval;

a controller coupled to the at least one result counter and to the processor, configured to suppress injection of the filtered result packets by the processor when the at least one result count exceeds a threshold.

In one embodiment of the invention, the at least one result counter includes a first result counter for obtaining a first result count of the at least one result count in a first time interval of the at least one result time interval. The result packet generator further includes an input counter coupled to the processor, for obtaining an input count of non-idle words of the input data stream in an input time interval. The controller is configured to suppress injection of the filtered result packets by the processor when the first result count divided by a clock count in the first result time interval exceeds a difference between an output bandwidth percentage threshold and the input count divided by a clock count in the input time interval. In other words, the injection of the filtered result packets is suppressed when a bandwidth percentage used for filtered result packets generation exceeds a difference between the output bandwidth percentage threshold and the bandwidth percentage used by the customer's traffic. The output bandwidth percentage threshold can be externally programmed.

In one embodiment, the processor is configured to parse filtered result packets to be generated into truncated and fragmented filtered result packets when a filtered result packet's length exceeds a maximum Ethernet packet length. The truncated filtered result packet includes a first portion of an input data packet containing the target data pattern encapsulated with Ethernet encapsulation and first additional data, and the fragmented filtered result packet includes the Ethernet encapsulation and a second portion of the input data packet encapsulated with the Ethernet and second additional data.

In accordance with the invention, there is further provided a method for controlling injection of filtered result packets into an input data stream including input data packets, so as to obtain an output data stream, the method comprising (a) receiving the input data packets at the processor;

(b) generating, via the processor, filtered result packets including encapsulated data of input data packets containing a target data pattern;

(c) obtaining, in the at least one result counter, at least one result count of non-idle words of the generated filtered result packets in at least one result time interval; and (d) suppressing, by means of the controller, injection of the filtered result packets generated in step (b) into the input data stream when the at least one result count exceeds a threshold.

The above described result packet generators and methods are particularly useful when implemented in Application Specific Integrated Circuit (ASIC) for use in Small Form-factor Pluggable (SFP) optical fiber transceivers, with some intelligent packet processing engine for generation of FRP. Since the hardware is based in a SFP transceiver, the price of this intelligent SFP probe can be much lower than the price of prior-art bulky box-based equipment. A customer can install these miniature network probes at a multitude of locations of the network, to form a distributed processing system. Instead the conventional centralized hardware approach, the controlling system can be implemented in web-based software to program the multiple probes and remotely collect the data over the network using the SFP probes.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
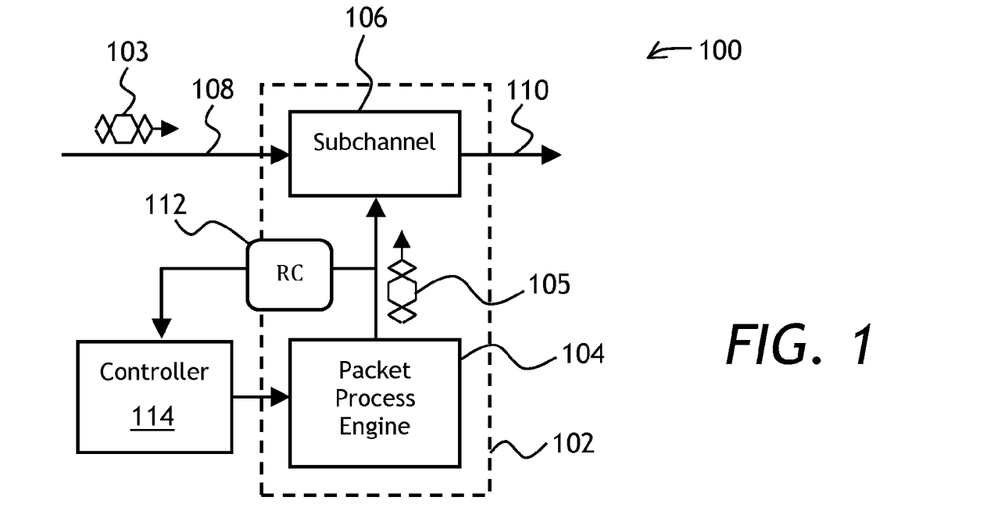
FIG. 1 is a block diagram of a result packet generator of the invention.

Referring to FIG. 1, a result packet generator 100 includes a processor 102, a controller 114, and at least one result counter 112. The processor 102 includes a packet processing engine 104 for generating FRP 105, coupled to a subchannel 106 for injecting the generated FRP 105 into an input data stream 108, thereby obtaining an output data stream 110. The at least one result counter 112 is coupled to the processor 102 between the packet processing engine 104 and the subchannel 106. The controller 114 is coupled to the result counter 112 and to the packet processing engine 104 of the processor 102.

In operation, the processor 102 receives input data packets 103 of the input data stream 108. The packet processing engine 104 generates the FRP 105 including at least some encapsulated data of the input data packets 103 containing a target data pattern, not shown. The generated FRP 105 are injected through the subchannel 106 into the input data stream 108. The at least one result counter 112 obtains at least one result count of non-idle words of the generated FRP 105 in at least one result time interval. For example, for Ethernet packet traffic, the non-idle words can include Ethernet preamble (4 words), Packet Body (N words), FCS (Frame Check Sequence, 2 words), EOP (end-of-packet, 1 word), and minimum IPG (inter-packet gap, 6 words).

The controller 114 is configured to suppress the injection of the FRP 105 via the subchannel 106, and/or to suppress the generation of the FRP 105 by the packet processing engine 104, when the at least one result count exceeds a threshold. The controller 114 includes registers, not shown, for containing the threshold value and the at least one result time interval value. The registers can be made updateable via a remote command, allowing the generation rate of the FRP 105 to be remotely controlled.

Figure 2A:
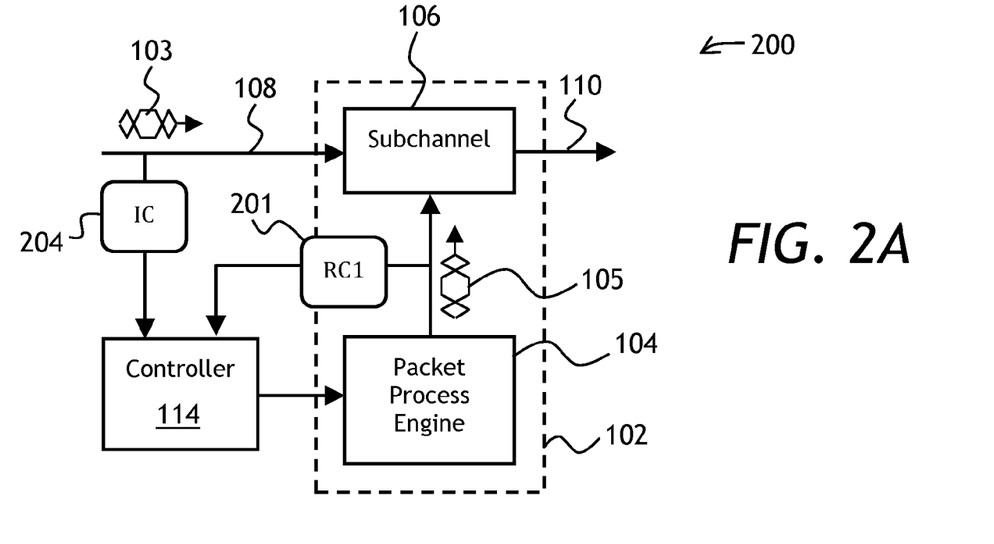
FIG. 2A is a block diagram of an embodiment of the result packet generator of FIG. 1 having an input counter.

While the result packet generator 100 of FIG. 1 provides a controllable rate of generation of the FRP 105, it is generally preferable that the generation rate be sensitive to the local unused bandwidth, for better bandwidth utilization. Turning to FIG. 2A with further reference to FIG. 1, a result packet generator 200 is a variant of the result packet generator 100 of FIG. 1, and includes the processor 102, the controller 114, and a first result counter 201, corresponding to the at least one result counter 112 of the result packet generator 100 of FIG. 1. The result packet generator 200 of FIG. 2 further includes an input counter 204 coupled to the processor 102. The function of the input counter 204 is to obtain an "input count" of non-idle words of the input data stream 108 in an input time interval. In operation, the first result counter 201 obtains a first result count in a first time interval. The controller 114 is configured to suppress injection of the FRP 105 by the processor 102 when a percentage of the bandwidth used for the generation of the FRP 105 exceeds a pre-determined portion of the presently available bandwidth that is not used for the customer's data traffic. The bandwidth percentage is defined using the following formula:

$$\text{Bandwidth Percentage} = \text{Non-IDLE Words Count} / \text{Clock Count} \quad (1)$$

The Non-IDLE Word Count and the Clock Count are counted in a corresponding pre-determined time interval. For example, the input bandwidth percentage is determined in the input time interval, and the FRP bandwidth percentage is determined in the first time interval. The Clock Count is a total word count, IDLE or Non-IDLE, in the given time interval. In view of the definition given by Eq. (1), the above bandwidth limiting condition can be formulated as the following Condition (A):

(A) The first result count divided by a clock count in the first result time interval exceeds a difference between an output bandwidth percentage threshold and the input count divided by a clock count in the input time interval.

In other words, when the incoming data packets 103 have a bandwidth percentage that is higher than a certain pre-determined threshold (that is, the "output bandwidth percentage threshold"), the generation of the FRP 105 needs to be disabled to prevent overfilling of the available bandwidth and the resulting interruption of the customer traffic, that is, to prevent interruption of the flow of the incoming data packets 103.

Figure 2B:
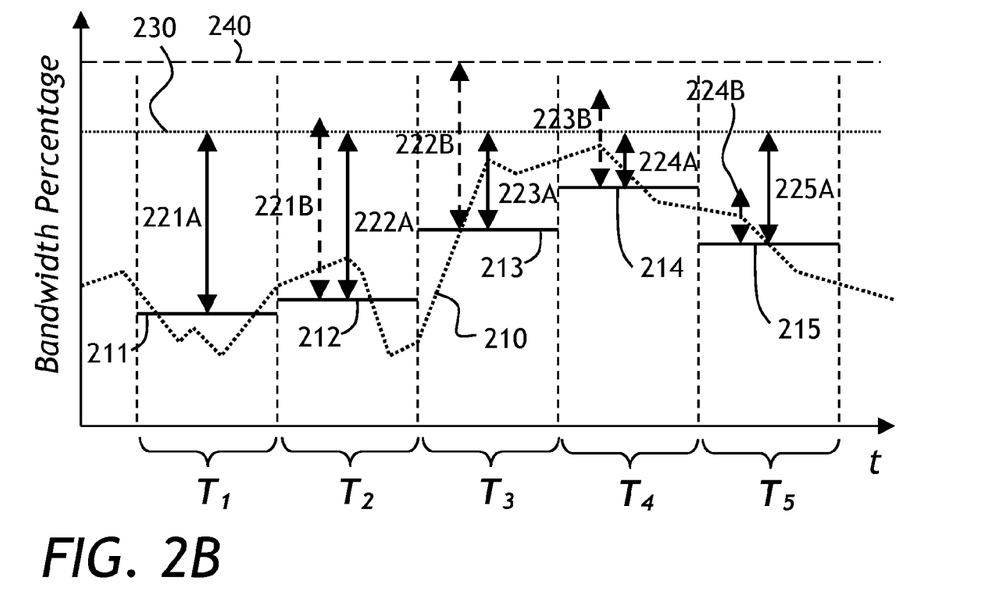
FIG. 2B is a time trace of bandwidths and thresholds, illustrating the operation of the bandwidth limiting mechanism of the result packet generator of FIG. 2A.

The operation of the result packet generator 200 of FIG. 2A is illustrated in a time diagram of FIG. 2B. In FIG. 2B, bandwidth percentages and utilization levels are plotted as a function of time. An instant input bandwidth percentage 210 is plotted in a thick dotted line. Bandwidth limits of 80% and 100%, selected for illustration purposes, are represented by thin dotted and dashed horizontal lines 230 and 240, respectively. The clock counts are performed in consecutive equal time windows $T_1 \ldots T_5$. In this example, the "output bandwidth percentage threshold" is the 80% bandwidth limit 230. Since the time windows $T_1 \ldots T_5$ are equal to each other, the clock count in these windows is a same number. Inverse of this number is a proportionality coefficient between a Non-IDLE word count by a counter, such as the input counter 204 or the first result counter 201, and a bandwidth percentage measured by that counter.

In the first time interval $T_1$, the measured first input bandwidth percentage is represented by a solid line 211. The solid line 211 represents a bandwidth utilization level obtained by dividing the first input count by the clock count. The 80% output bandwidth percentage threshold 230 minus the first input bandwidth percentage 211 is illustrated by a solid double-headed arrow 221A. In accordance with the condition (A) above, this value is used as a FRP bandwidth limit in the next time interval $T_2$. This bandwidth limit is denoted by a dashed double-headed arrow 221B in the second time interval $T_2$. The height of the dashed arrow 221B is equal to that of the solid arrow 221A. For as long as the bandwidth percentage of the generated FRP 105 in the second time window $T_2$ does not exceed the limit 221B, the FRP generation is not suppressed; and when it exceeds the limit 221B, the FRP generation or injection is suppressed to avoid overfilling the bandwidth.

Still referring to FIG. 2B, in the second time window $T_2$, the input bandwidth utilization level is increased to a second level 212. Thus, the 80% bandwidth utilization may be reached in the second time window $T_2$ even when the FRP generation and/or injection into the input data stream 108 is suppressed upon fulfilling the condition (A) at 80% output bandwidth percentage threshold, because the condition (A) is using the bandwidth utilization level in the previous time interval $T_1$, and a presently measured level 222A will be used for the next time window $T_3$. This does not impose a problem, for as long as the 100% bandwidth utilization level 240 is not exceeded. In other words, the 80% bandwidth utilization level 230 has a 20% safety margin built in. This 20% safety margin accounts for a possible rate of increase of the input bandwidth. A particular value of the safety margin is selected depending upon expected rate of increase of the input bandwidth 210. For example, in the third time window $T_3$, an input bandwidth utilization level 213 is further increased, and the 100% bandwidth utilization 240 can be reached as indicated at 222B, so that the 20% margin is barely enough in this example. Interestingly, in the fourth time window $T_4$, the 100% bandwidth utilization 240 cannot be reached even though the instantaneous input bandwidth percentage 210 and a corresponding input level 214 continue to grow. Levels 213, 214, and 215, and corresponding FRP bandwidth utilization limits 223A, B; 224A, B; and 225A illustrate the further evolution of the bandwidth percentage available for FRP generation, in a similar manner.

Figure 3:
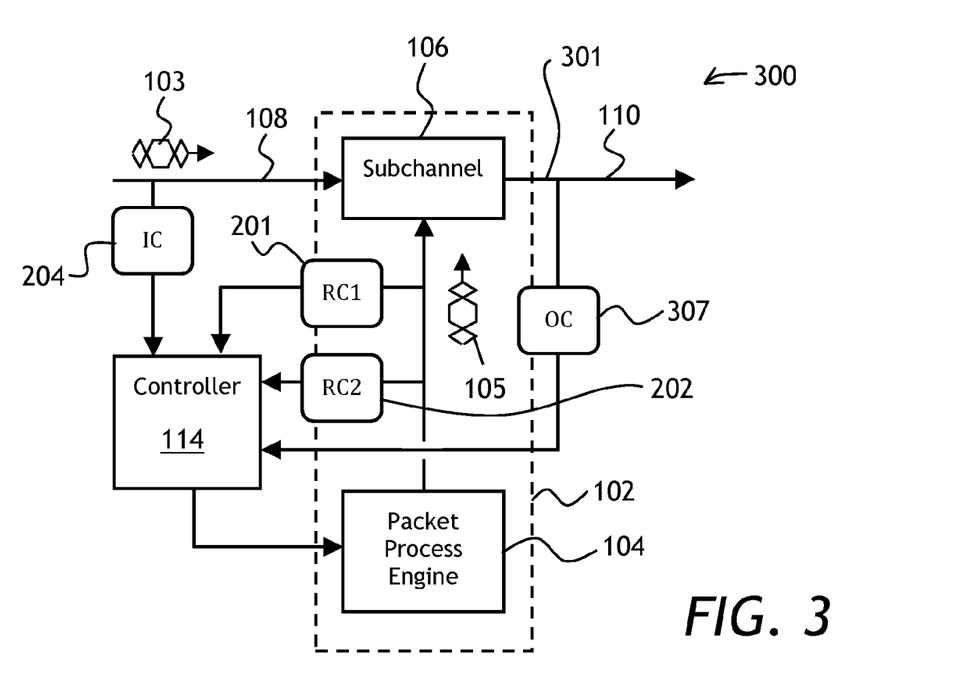
FIG. 3 is a block diagram of another embodiment of the result packet generator of FIG. 2A including two result counters and an output counter.

To further improve the bandwidth utilization, and to lower the chances of exceeding the maximum bandwidth and thus blocking customer's traffic, more counters can be added to a result packet generator of the invention. Referring now to FIG. 3, a result packet generator 300 is a variant of the result packet generators 100 and 200 of FIGS. 1 and 2A, respectively, and includes same or similar elements. In the result packet generator 300 of FIG. 3, an output counter 307 is coupled at an output port 301 of the subchannel 106 of the processor 102, for obtaining an output count of non-idle words of the output data stream 110 in an output time interval. The controller 114 is configured for suppressing injection of the FRP 105 by the processor 102 when the following condition (B) is fulfilled:

(B) The output count divided by a clock count in the output time interval exceeds the output bandwidth percentage threshold.

Preferably, the controller 114 has remotely updateable registers for containing one or more of: the input time interval, the output time interval, and the output bandwidth percentage threshold. In the embodiment shown, the result packet generator 300 includes an optional second result counter 202 for obtaining a second result count of the at least one result count in a second result time interval, different from the first result time interval. The controller 114 is configured to read a remotely programmable Flow Control flag, and to suppress injection of the FRP upon occurrence of at least one of the following:

the condition (A) above is fulfilled and the Flow Control flag is raised;
the condition (B) above is fulfilled and the Flow Control flag is raised; and
the second result count exceeds a second result threshold count.

In one embodiment, the controller 114 includes a first register, not shown, updateable via a remote command, for containing a same value for the first result time interval, the input time interval, and the output time interval, which are thus equal to each other. The controller 114 can also include second and third registers, not shown, updateable via remote commands, for containing the second result time interval and the output bandwidth percentage threshold, respectively. This allows for a greater flexibility in controlling the FRP generation bandwidth. The second result count interval and the second result threshold count can be made much larger than the first interval/threshold counts. This allows one to make sure that the bandwidth used for generating FRP 105 is not exceeded over much longer time periods.

Methods of operating the result packet generators 100, 200, and 300 will be considered in more detail further below.

Figure 4:
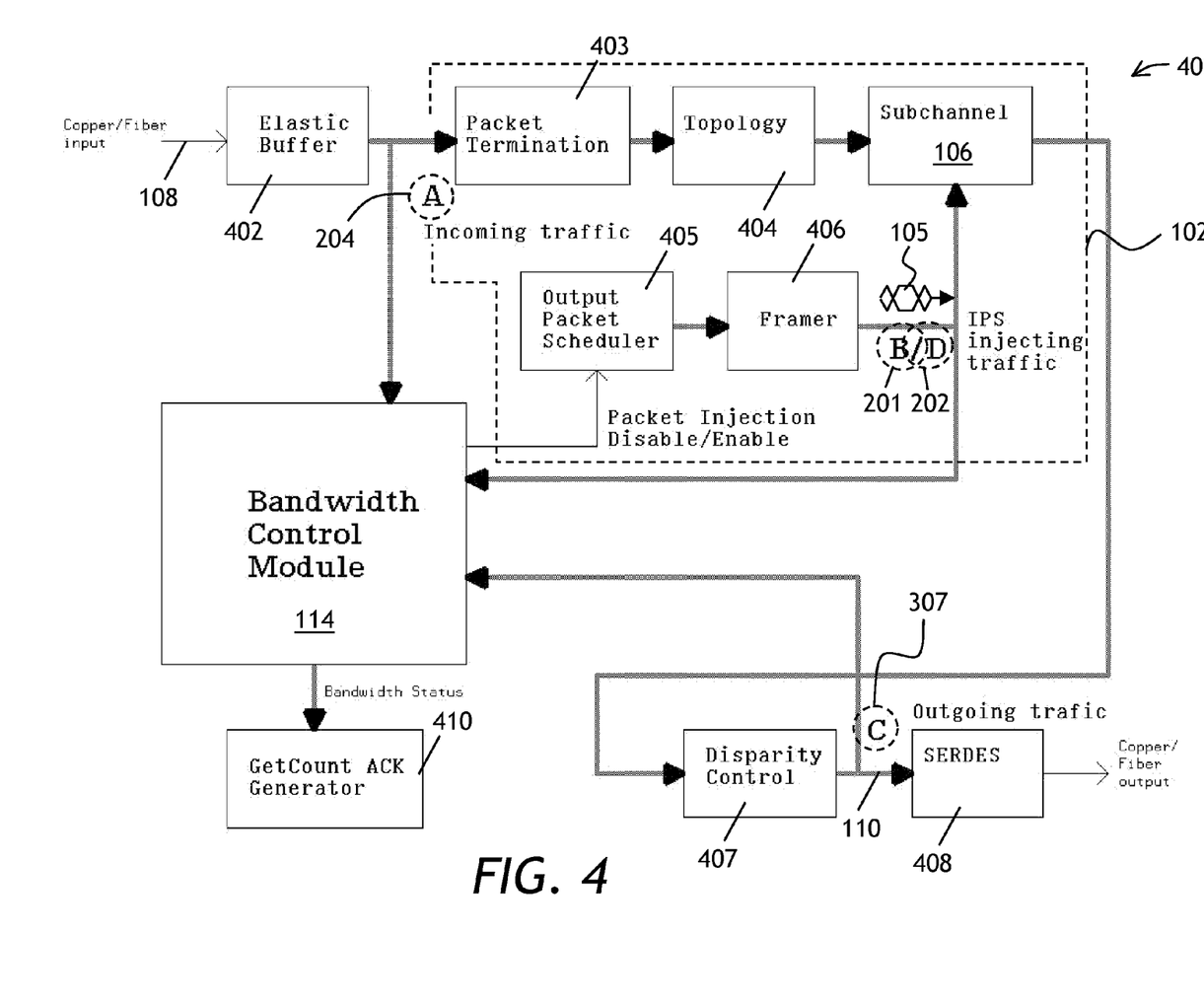
FIG. 4 is a block diagram of a result packet generator of FIG. 3 implemented in a "smart" SFP optoelectronic transceiver.

Turning now to FIG. 4 with further reference to FIGS. 2A, 2B, and FIG. 3, a fiber-to-copper interface unit 400 of the invention is a variant of the result packet generator 300 of FIG. 3. The fiber-to-copper interface unit 400 includes the controller 114, the processor 102, the input counter 204 providing a measurement "A", the first and second result counters 201 and 202 providing measurements "B" and "D", respectively, and the output counter 307 providing a measurement "C". These units operate as described above. The processor 102 includes a packet termination unit 403, a topology unit 404, the subchannel 106, an output packet scheduler 405, and a framer 406. The fiber-to-copper interface unit 400 further includes an elastic buffer 402, a disparity control unit 407, a serializer 408, and a GetCount ACK generator 410.

In operation, the input data stream 108 received from an optical fiber, not shown, is placed in the elastic buffer 402. The incoming optical data packets are processed in the packet termination unit 403 and the topology unit 404, and are combined with the FRP 105, which is scheduled and framed in the scheduler 405 and the framer 406, respectively. After correcting the data disparity in the disparity control unit 407, the output data stream 110 is serialized in the serializer 408 and outputted to the copper carrier, not shown.

A bi-directional fiber-to-copper interface unit, not shown, includes two result packet generators 400, one for a fiber-to-copper direction, and one for a copper-to-fiber direction. As noted above, the bi-directional fiber-to-copper interface unit is preferably implemented as an ASIC in an SFP package. This allows one to considerably reduce costs per single interface unit 400/result packet generator 300, which can enable their widespread implementation across packet-switched copper/fiberoptic networks, with a Web-based interface to control individual interface units 400/result packet generators 300.

In a preferred embodiment, the A, B, and C measurements use a same short timing window termed Interval #1, with programmable 10 microseconds step resolution up to 1 millisecond. The D measurement is using a wider timing window termed Interval #2 with programmable 5 milliseconds step resolution up to 1 second. The A, B and C measurements are each implemented in a 16-bit counter to count the number of Non-IDLE words, one word taking 16 ns in every timing window $T_1 \ldots T_5$, and they are cleared to zero by an end of every timing window $T_1 \ldots T_5$. The upper 10 bits of the output counter 307 for the measurement C are compared with 3rd word parameter, or 10 least significant bits, of a Smart Optics Control Protocol (SOCP) command, defining a threshold level Ct for the measurement C, to generate a flag for packet injection off (FLAG_C). The threshold level Bt for the measurement B is internally generated with given threshold level Ct, according to the following equation:

$$Bt = Ct - A[15:6] \qquad (2)$$

Herein, the [15:6] denotes the upper 10 bits of a 16-bit register/counter.

When the measurement B in the Interval #1 is bigger than Bt given by Eq. (2) above, a flag for packet injection off (FLAG_B) is generated. If the measurement A is bigger than Ct, Bt is set to zero. The measurement A is a latched value of the input counter 204 at every end of the timing window $T_1 \ldots T_5$, so that the maximum bandwidth for the probe injecting traffic is automatically set with previous timing window's incoming bandwidth, measurement A, and the given bandwidth limit for the outgoing traffic, Ct, as explained above with reference to FIG. 2B. The measurement D has a 26-bit counter to count Non-IDLE words in every Interval #2, and it is cleared to zero on every end of the timing window $T_1 \ldots T_5$. The upper 16 bits of the second result counter 202 are compared with the $4^{th}$ for copper output injection, and $5^{th}$ for Fiber output injection word parameter of a SOCP command defining threshold level of the second result counter 202, to generate a flag for packet injection off (FLAG_D). The final packet injection disable FLAG is generated according to the following logic:

$$\text{FLAG} = ((\text{FLAG\_B or FLAG\_C}) \text{ and } <\text{Probe Output Bandwidth Flow control}>) \text{ or FLAG\_D} \qquad (3)$$

The FLAG of Eq. (3) becomes TRUE when the counter value exceeds its threshold level. The "short-window bandwidth limit" given by the expression FLAG_B or FLAG_C can be optionally set ON or OFF by setting the Probe Output Bandwidth Flow control flag to one and zero, respectively.

The Probe Output Bandwidth Flow control flag can be separately set or reset for each direction, from fiber to copper and from copper to fiber. These flags are disabled in each direction as the power-on default. If the final packet injection disable flag is asserted, the FRP injection will be temporally disabled.

An Example Implementation of Counters and Flags

The 100% output bandwidth level 240 of FIG. 2B with time window=1 millisecond can be represented by the following count:

1 ms/16 ns=62500. This is the number of 16 ns words in the 1 ms time interval.

$62500/2^6 = 976.56$. The divider $2^6$ is used because 6 least significant bits of the 16-bit output counter 307 are not used in this example. So, if one desires to set the 80% level 230 as the output bandwidth, the threshold Ct for the measurement C must be set to 976.56*80%=781.

The count for 100% bandwidth with time window=1 second is found as follows:

1 s/16 ns=62500000. This is the number of words in 1 second time interval.

$62500000/2^{10} = 61035.156$. The divider $2^{10}$ is used because 10 least significant bits of the 26-bit second result counter 202 are not used in this example. So, if one wants to set e.g. 3% as the probe injecting traffic bandwidth, the threshold Dt for the measurement D must be set to 1831, or 61035.156*3%.

An 8-bit register T1, not shown, stores the number of 10 microsecond intervals to make the Interval #1 for the output bandwidth measurement. An 8-bit register T2, not shown, stores the number of 5 millisecond intervals to make Interval #2 for the injected bandwidth measurement. T2 can be up to 213 to make the interval=1.0734 seconds. T1 and T2 must be bigger than 1. The bandwidth status can be read by a GetCount ACK acknowledgement packet generated by the GetCount ACK generator 410, with 4-bit counter for the measurement A by the input counter 204, 1-bit flag for Measurements B, C, and D by the respective counters 201, 307, and 202. The 4-bit counter for the measurement A by the input counter 204 increments the counter when the 10 must significant bits of the input counter 204 exceeds Ct at the end of the 1 millisecond timing window, and stays on 15 if it is incremented more than 15 times. The other 1-bit flags for measurements B, C, and D by the respective counters 201, 307, and 202 will be set to 1 if the counter value exceeds its threshold level at the end of the respective timing windows. Those 4 bits counter and flags will be cleared to 0 when a GetCount ACK packet is sent.

Figure 5:
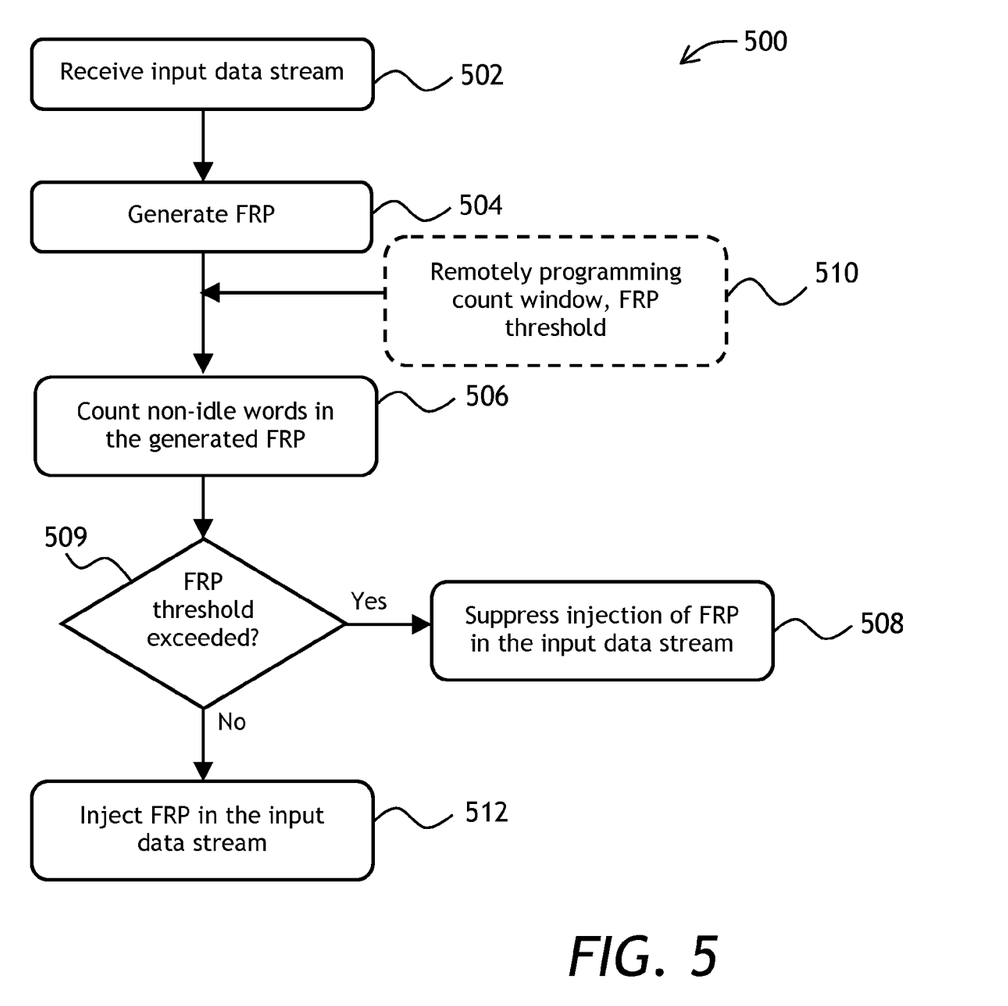
FIG. 5 is a flow chart of a method for controlling injection of FRP using the apparatus of FIG. 1.

Turning now to FIG. 5 with further reference to FIG. 1, a method 500 for controlling injection of the FRP 105 is presented. The method 500 can be implemented with the result packet generator 100 of FIG. 1. The method 500 includes a step 502 of receiving the input data packets 103 at the processor 102. In a step 504, the FRP 105 are generated by the processor 102. As noted above, the FRP include encapsulated data of the input data packets 103 containing a target data pattern, which can be associated with a network fault, for example. In a step 506, at least one result count of non-idle words of the generated FRP 105 is obtained in at least one result time interval by the at least one result counter 112. In a step 509, a check is performed whether the at least one result count exceeds at least one result count threshold. If the threshold is exceeded, then, in a step 508, the controller 114 suppresses injection of the FRP 105 into the input data stream. If not, the FRP 105 are injected by means of the subchannel 106 into the input data stream 108 in a step 512. In an optional step 510 performed before the counting step 506/the threshold check step 509, the at least one result time interval/the at least one result count threshold, respectively, are remotely programmed into the controller 114.

Figure 6:
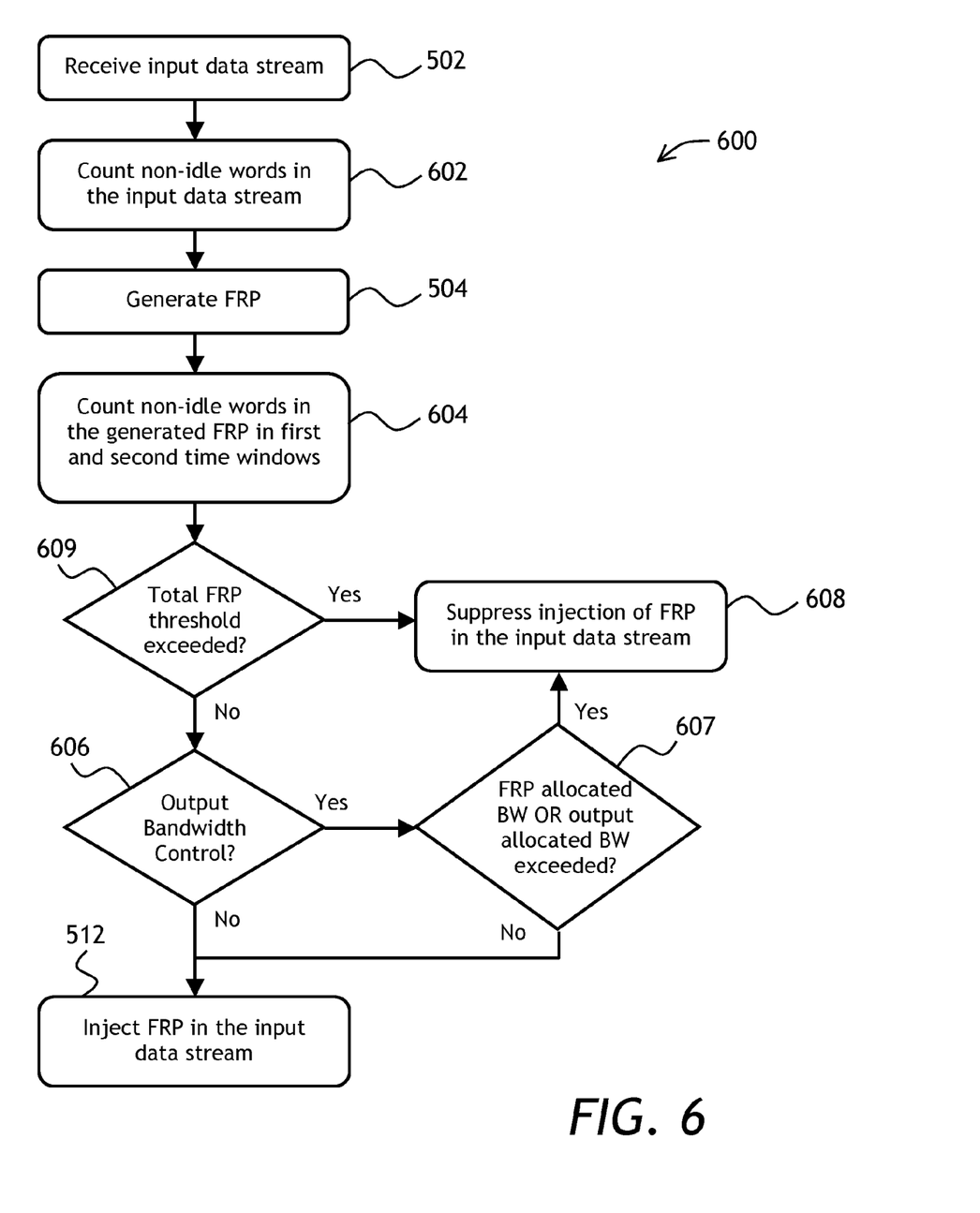
FIG. 6 is a flow chart of a method for controlling injection of FRP using the apparatuses of FIG. 3 or FIG. 4.

Referring to FIG. 6 with further reference to FIGS. 3 and 5, a method 600 for controlling injection of the FRP 105 is an embodiment of the method 500 of FIG. 5. The method 600 can be implemented with the result packet generator 300 of FIG. 3. In the method 600 of FIG. 6, more counters are used, and the bandwidth available for FRP generation is calculated based on the existing data traffic rate. After the input data stream is received in the step 502, in a step 602, the input counter 204 is used to obtain the input count of non-idle words of the input data stream 108 in the input time interval. The FRP 105 are generated in the step 504 as described above; and then, in a step 604, non-idle words in the generated FRP 105 are counted in first and second result time intervals. In the "Example Implementation" above, the first time interval is up to 1 ms, and the second time interval is up to 1 second. Then, in a step 609, a check is performed if the count of the non-idle FRP words in the second result time interval is exceeded. If yes, then in a step 608, the injection of the FRP 105 into the input data stream 108 is suppressed. If not, then, in a step 606, the Output Bandwidth Control flag is checked. If the flag is not set, then in the step 512, the FRP 105 are injected into the input data stream 108.

If the Output Bandwidth Control flag is set, two more checks are performed in the step 607: first, if the FRP allocated bandwidth as given by the condition (A) above is exceeded, and second, if the output allocated bandwidth as given by the condition (B) above is exceeded. If the at least one of these checks gives a positive result, then the FRP generation/injection is suppressed in the step 608.

Various modifications of the method 600 are possible. In one embodiment, the condition (B), and/or the Output Bandwidth Control flag are not checked. The input and/or output time intervals and/or the output bandwidth threshold may be remotely programmed in, before the respective counting/checking steps 602, 604, 606, 607, or 609. The modified method 600 can be used to control injection of FRP 105 in the result packet generator 200 of FIG. 2A, and/or at a bi-directional fiber-to-copper interface including two result packet generators 400 of FIG. 4, for both fiber-to-copper and copper-to-fiber directions.

The FRP 105 are generated based on the pre-programmed expected or mask data which is compared against the incoming packet data 103. Once the incoming packet data matches the mask data, the FRP 105 will be packaged with Ethernet encapsulation and some other additional flags, a time stamp, etc. By way of example, in FIG. 7A, a data packet 750 includes data 752 that matches a mask data 762, a preamble 770, and end of packet (EOP) words 771. An FRP 780 is generated by packaging the data packet 750 with Ethernet encapsulation 703 and additional data 720.

Figure 7A:
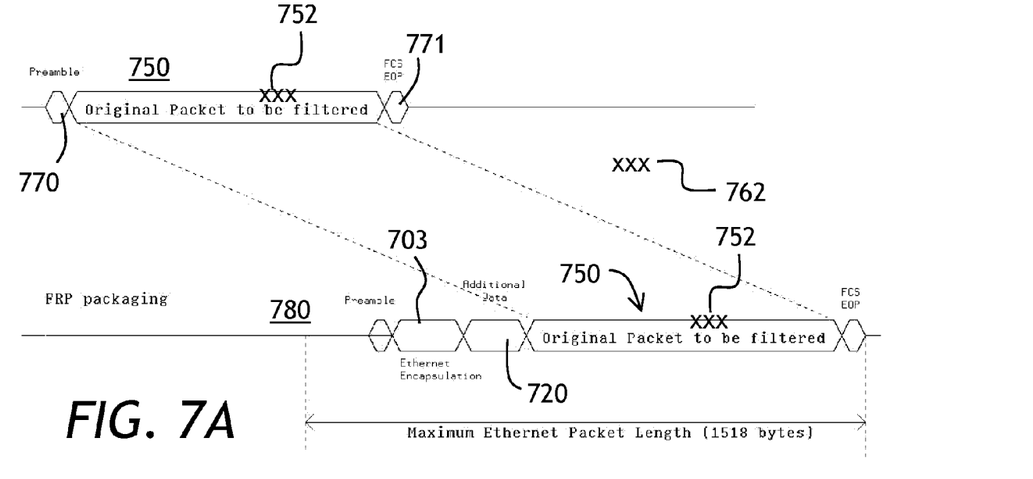
FIGS. 7A and 7B are diagrams of non-truncated and truncated FRP, respectively.

Since the FRP 780 is packed with the original incoming packet 750, with the additional encapsulation, and with more data, the length of the FRP 780 may exceed a maximum regular size of a packet, for example 1518 bytes for Ethernet packets, so the original packet data might be truncated upon transmission. This creates a problem for subsequent analysis, because the packet routing engine system software will miss some part of the original packet data.

Figure 7B:
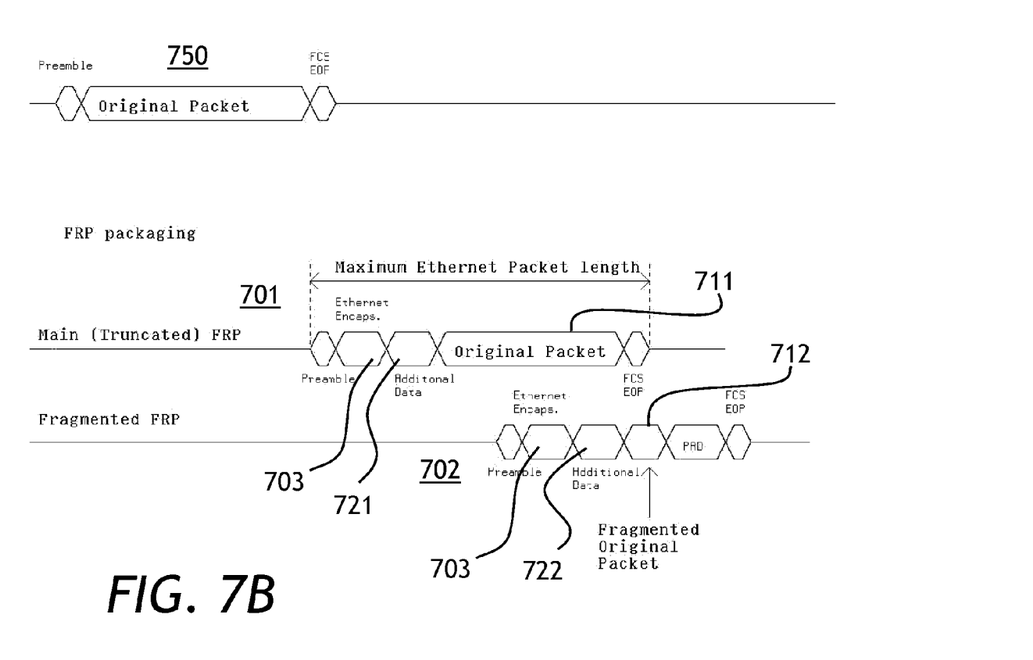

Referring now to FIG. 7B, the solution to the problem of FRP 780 exceeding a maximum packet length is to generate a truncated FRP 701 and a fragmented FRP 702, which carries the rest of the payload data that could not be carried on the truncated FRP 701. Both truncated FRP 701 and fragmented FRP 702 are encapsulated with the Ethernet encapsulation 703. Packet routing engine system software, not shown, will combine the truncated FRP 701 and fragmented FRP 702 to re-create the original data packet 750.

The truncated FRP 701 includes a first portion 711 of the input data packet 750 containing the target data pattern encapsulated with the Ethernet encapsulation 703 and first additional data 721. The fragmented FRP 702 includes the Ethernet encapsulation and a second portion 712 of the input data packet encapsulated with the Ethernet encapsulation 703 and second additional data 722. The first and second additional data 721 and 722 can include one or more flags indicating the category of the FRP 701 and 702, e.g. "Non-Truncated", "Truncated", or "Fragmented" flags.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Generally, a processor may be implemented using circuitry in any suitable format.

The hardware used to implement the various illustrative logics, logical blocks, modules, and circuits described in connection with the aspects disclosed herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. The general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A result packet generator comprising:
a processor configured to:
  receive input data packets of an input data stream,
  generate filtered result packets that include encapsulated data, of the input data packets, containing a target data pattern, and
  inject the filtered result packets into the input data stream to obtain an output data stream;
at least one result counter, coupled to the processor, configured to:
  obtain at least one result count of non-idle words of the generated filtered result packets in a plurality of result time intervals; and
a controller, coupled to the at least one result counter and to the processor, configured to:

suppress the injection of the filtered result packets by
the processor when the at least one result count
satisfies a threshold,
the controller including:
a first register that contains a first value for a first
time interval of the plurality of result time
intervals,
a second register that contains a second value for
a second time interval of the plurality of result
time intervals, and
a third register that contains an output bandwidth
percentage threshold, and
when suppressing the injection of the filtered result
packets, the controller is configured to suppress
the injection of the filtered result packets based on
the output bandwidth percentage threshold and at
least one of the first time interval or the second
time interval.

2. The result packet generator of claim 1, wherein the first register is updateable via a remote command.

3. The result packet generator of claim 1,
wherein the at least one result counter includes a first
result counter configured to obtain a first result count of
the at least one result count in the first time interval;
wherein the result packet generator further comprises:
an input counter, coupled to the processor, configured
to obtain an input count of non-idle words of the
input data stream in an input time interval; and
wherein, when suppressing the injection of the filtered
result packets, the controller is configured to:
suppress the injection of the filtered result packets by
the processor when the first result count divided by
a clock count in the first time interval exceeds a
difference between the output bandwidth percentage
threshold and the input count divided by a clock
count in the input time interval.

4. The result packet generator of claim 1, further comprising:
an output counter, coupled to the processor, to obtain an
output count of non-idle words of the output data
stream in an output time interval,
wherein, when suppressing the injection of the filtered
result packets, the controller is configured to:
suppress the injection of the filtered result packets by
the processor when the output count divided by a
clock count in the output time interval exceeds the
output bandwidth percentage threshold.

5. The result packet generator of claim 1, wherein the second register is updateable via a remote command.

6. The result packet generator of claim 1,
wherein the at least one result counter further includes a
second result counter configured to obtain a second
result count of the at least one result count in the second
time interval; and
wherein, when suppressing the injection of the filtered
result packets, the controller is configured to:
read a remotely programmable Flow Control flag, and
suppress the injection of the filtered result packets
when the remotely programmable Flow Control flag
is raised or the second result count exceeds a second
result threshold count.

7. The result packet generator of claim 1, wherein the first value is further for an input time interval and an output time interval.

8. The result packet generator of claim 1, where, when receiving the input data packets, the processor is configured to:
receive the input data packets via a bi-directional fiber-to-copper interface unit that includes the result packet generator.

9. The result packet generator of claim 1,
wherein the processor is further configured to:
parse a filtered result packet, of the filtered result
packets, into a truncated packet and a fragmented
packet when the filtered result packet has a length
exceeding a maximum Ethernet packet length, and
wherein the truncated packet includes:
a first portion of an input data packet, of the input data
packets, containing the target data pattern, and
first additional data, and
wherein the fragmented packet includes:
a second portion of the input data packet, and
second additional data.

10. The result packet generator of claim 9,
wherein the first additional data includes a Truncated flag, and
wherein the second additional data includes a Fragmented flag.

11. A method comprising:
receiving, by one or more processors, input data packets
of an input data stream;
generating, by the one or more processors, filtered result
packets that include encapsulated data, of the input data
packets, containing a target data pattern;
obtaining, using at least one result counter, a first result
count of non-idle words of the filtered result packets in
a first time interval;
obtaining, using the at least one result counter, a second
result count in a second time interval;
obtaining, using an output counter, an output count of
non-idle words of an output data stream in an output
time interval,
the first time interval, the second time interval, and the
output time interval being equal; and
suppressing, by using a controller, injection of the filtered
result packets into the input data stream based on an
output bandwidth percentage threshold and at least one
of the first result count, the second result count, the first
time interval, the second time interval, or the output
count.

12. The method of claim 11, further comprising:
remotely programming the first time interval.

13. The method of claim 11, wherein suppressing the injection of the filtered result packets comprises:
using an input counter to obtain an input count of non-idle
words of the input data stream in an input time interval;
and
suppressing the injection of the filtered result packets
when the first result count divided by a clock count in
the first time interval exceeds a difference between the
output bandwidth percentage threshold and the input
count divided by a clock count in the input time
interval.

14. The method of claim 11, wherein suppressing the injection of the filtered result packets comprises:
suppressing the injection of the filtered result packets
when the output count divided by a clock count in the
output time interval exceeds the output bandwidth
percentage threshold.

15. The method of claim 11, further comprising:
remotely programming the output time interval.

16. The method of claim 11, wherein suppressing the injection of the filtered result packets comprises:
reading a remotely programmable Flow Control flag, and suppressing the injection of the filtered result packets when the Flow Control flag is raised.

17. The method of claim 11, further comprising:
remotely programming the output bandwidth percentage threshold.

18. The method of claim 11, wherein the input data packets are received at a bi-directional fiber to copper interface that is for both fiber-to-copper and copper-to-fiber directions.

19. The method of claim 11, further comprising:
parsing a filtered result packet, of the filtered result packets, into a truncated packet and a fragmented packet when the filtered result packet has a length exceeding a maximum Ethernet packet length,
wherein the truncated packet includes:
a first portion of an input data packet, of the input data packets, containing the target data pattern, and
first additional data, and
wherein the fragmented packet includes:
a second portion of the input data packet, and
second additional data.

20. The method of claim 19,
wherein the first additional data includes a Truncated flag, and
wherein the second additional data includes a Fragmented flag.

\* \* \* \* \*